(12) United States Patent
Bottomley et al.

(10) Patent No.: US 8,444,888 B2
(45) Date of Patent: May 21, 2013

(54) METHOD FOR PROCESSING A CROSSLINKABLE ELASTOMERIC COMPOSITION COMPRISING SILICA

(75) Inventors: Alan Bottomley, Milan (IT); Leonard Brian Hazell, Guilford (GB)

(73) Assignee: Pirelli Tyre S.p.A., Milan (IT)

( * ) Notice: Subject to any disclaimer, the term of this patent is extended or adjusted under 35 U.S.C. 154(b) by 933 days.

(21) Appl. No.: 12/225,582

(22) PCT Filed: Apr. 5, 2006

(86) PCT No.: PCT/EP2006/003075
§ 371 (c)(1),
(2), (4) Date: May 18, 2009

(87) PCT Pub. No.: WO2007/112765
PCT Pub. Date: Oct. 11, 2007

(65) Prior Publication Data
US 2009/0220805 A1 Sep. 3, 2009

(51) Int. Cl.
*B28B 7/36* (2006.01)
(52) U.S. Cl.
USPC ............. 264/39; 264/169; 264/213; 264/300
(58) Field of Classification Search
USPC ................. 264/2.3, 39, 213, 300; 425/90, 96, 425/102; 106/2, 38.2, 38.22, 38.23, 38.24, 106/38.25
See application file for complete search history.

(56) References Cited

U.S. PATENT DOCUMENTS

| | | | |
|---|---|---|---|
| 3,564,651 A * | 2/1971 | Covington et al. | 366/343 |
| 4,714,733 A * | 12/1987 | Itoh et al. | 524/493 |
| 5,106,911 A * | 4/1992 | Chapman et al. | 525/199 |
| 5,396,940 A * | 3/1995 | Segatta et al. | 152/209.1 |
| 5,601,641 A * | 2/1997 | Stephens | 106/38.25 |
| 5,750,197 A | 5/1998 | Van Ooij et al. | |
| 6,261,638 B1 * | 7/2001 | van Ooij et al. | 427/379 |
| 6,300,453 B1 * | 10/2001 | De Buyl et al. | 528/18 |
| 6,528,585 B1 * | 3/2003 | Standke et al. | 525/102 |
| 6,919,469 B2 | 7/2005 | Van Ooij et al. | |
| 2003/0088016 A1 * | 5/2003 | Zhong | 524/588 |
| 2004/0028829 A1 | 2/2004 | Van Ooij et al. | |
| 2004/0071906 A1 * | 4/2004 | Brewis et al. | 428/35.7 |

FOREIGN PATENT DOCUMENTS

| | | | |
|---|---|---|---|
| EP | 773093 A1 * | 5/1997 | |
| GB | 2362846 A * | 12/2001 | |
| JP | 60211083 A * | 10/1985 | |
| WO | WO 98/30735 A2 | 7/1998 | |
| WO | WO 2005/058615 A1 | 6/2005 | |

OTHER PUBLICATIONS

EPO English Abstract of EP773093, 1996.*
English machine translation of EP773093, retrieved from EPO database Feb. 29, 2012.*
http://www.rubberandplasticmachinery.com/home/mixers/used-banbury-mixers/used-farrel-br-banbury-mixer (retrieved Feb. 29, 2012).*
JPO English Abstract of JP60211083, 1985.*
"Rubber Compounding Ingredients—Carbon black—Determination of Surface Area—CTAB Adsorption Methods", International Standard ISO 6810:1995(E), 14 pages, (1995).

* cited by examiner

*Primary Examiner* — Timothy Kennedy
(74) *Attorney, Agent, or Firm* — Finnegan, Henderson, Farabow, Garrett & Dunner, L.L.P.

(57) ABSTRACT

A method for processing a crosslinkable elastomeric composition including at least one silica reinforcing filler and at least one sulfur-containing organosilane compound by using at least one processing apparatus having an internal metal surface, includes the following steps: (a) pretreating at least one portion of the internal metal surface of the at least one processing apparatus with at least one sulfur-free organosilane compound having at least one hydrolizable group; (b) feeding the crosslinkable elastomeric composition including silica to the at least one processing apparatus; and (c) processing the crosslinkable elastomeric composition.

39 Claims, No Drawings

METHOD FOR PROCESSING A CROSSLINKABLE ELASTOMERIC COMPOSITION COMPRISING SILICA

CROSS REFERENCE TO RELATED APPLICATION

This application is a national phase application based on PCT/EP2006/003075, filed Apr. 5, 2006, the content of which is incorporated herein by reference.

BACKGROUND OF THE INVENTION

1. Field of the invention

The present invention relates to a method for processing a crosslinkable elastomeric composition comprising silica.

More in particular the present invention relates to a method for processing a crosslinkable elastomeric composition comprising silica by using at least one processing apparatus having an internal metal surface, said method comprising a pretreatment of said internal metal surface with at least one sulfur-free organosilane compound.

Moreover, the present invention also relates to a method for treating a metal surface with at least one sulfur-free organosilane compound.

Furthermore, the present invention also relates to a metal article having at least one surface which is at least partially coated with at least one coating layer comprising at least one sulfur-free organosilane compound.

2. Description of the Related Art

The treatment of metal surfaces with silane compounds, usually in order to prevent their corrosion, is known in the art.

For example, U.S. Pat. No. 5,750,197 relates to a method of treating a metal substrate comprising the steps of: (a) providing a metal substrate; (b) applying a coating of a first treatment solution directly onto the surface of said metal, said first treatment solution consisting essentially of at least one multi-functional silane having at least two tri-substituted silyl groups wherein the substituents are individually selected from the group consisting of alkoxy and acetoxy, wherein said multi-functional silane has been at least partially hydrolized, preferably fully hydrolized. Specific examples of multi-functional silanes which may be used are: 1,2-bis-(triethoxysilyl)ethane, 1,2-bis-(trimethoxysilyl)ethane, 1,6-bis-(trialkoxy-silyl)hexane [including 1,6-bis-(tri-methoxysilyl)-hexane], 1,2-bis-(triethoxysilyl)ethylene, 1,4-bis-(trimethoxysilylethyl)benzene, and 1,2-bis-(trimethoxysilylpropyl)amine. An optional second treatment solution containing an organofunctional silane may also be employed, in particular if the metal substrate has to be painted. Specific examples of organofunctional silanes which may be used to carry out said second treatment, are: γ-aminopropyltriethoxysilane, γ-mercaptopropyl-trimethoxysilane, γ-ureidopropyltrialkoxysilane, γ-glycidoxypropyl-trimethoxysilane, and any of a variety of vinyl silanes (i.e., an organofunctional silane wherein the organofunctional moiety is a vinyl group) including vinyltrimethoxysilane, vinyltriethoxysilane, vinyltriacetoxysilane. The abovementioned method of treating is said to give metal surfaces having an improved corrosion resistance.

U.S. Pat. No. 6,919,469 relates to a method for treating a metal substrate, comprising: (a) providing a metal substrate; and (b) applying a coating of a silane composition onto the metal substrate, the silane composition comprising at least one substantially unhydrolized aminosilane which has one or more secondary or tertiary amino group. Specific examples of amino-silanes which may be used are: bis-(trimethoxy-silylpropyl)amine, bis-(triethoxysilylpropyl)amine, bis-(triethoxysilylpropyl)ethylene diamine, N-[2-(vinyl-benzylamino)ethyl]-3-aminopropyltrimethoxysilane, aminoethylaminopropyltrimethoxysilane. The metal substrates treated as disclosed above, are said to have an improved corrosion resistance and/or an improved polymer adhesion.

In the rubber industry, in particular that of tires manufacturing, it is known practice to use the so-called "white" reinforcing fillers, in particular silica, in total or partial replacement for the carbon black in order to achieve good mechanical properties (both static and dynamic), as well as low hysteresis.

It is also known that, in order to obtain a good degree of dispersion of the silica in the elastomeric compositions, it is necessary to subject the elastomeric compositions to a prolonged thermomechanical blending action. Moreover, in order to increase the affinity of the silica with the elastomeric polymer, it is necessary to use suitable coupling agents, such as, for example, sulfur-containing organosilane compounds. However, the use of said sulfur-containing organosilane compounds may cause some drawbacks during the processing of the elastomeric compositions to which they are added.

In particular, the Applicant has noticed that, during the processing of crosslinkable elastomeric compositions in processing apparatuses having an internal metal surface, e.g. a Banbury mixer, said sulfur-containing organosilane compounds may interact with the internal metal surface of said processing apparatuses (in particular, it may chemically react with the hydroxy groups present onto said metal surface) and may subsequently promote the adhesion of the elastomeric polymer onto the same. Consequently, the internal metal surface which becomes sticky and rough, has to be cleaned, usually manually, at the end of every processing cycle so causing a lengthening in the processing of the elastomeric compositions and a premature wear of the processing apparatus.

SUMMARY OF THE INVENTION

The Applicant has now found that it is possible to avoid the drawbacks which may occur during the processing of crosslinkable elastomeric compositions comprising silica by using processing apparatuses having an internal metal surface by pretreating said internal metal surface with at least one sulfur-free organosilane compound. Said pretreatment prevents reaction of sulfur-containing organosilane compounds onto said internal metal surface and consequent adhesion of the elastomeric polymer onto the same.

According to a first aspect, the present invention relates to a method for processing a crosslinkable elastomeric composition comprising at least one silica reinforcing filler and at least one sulfur-containing organosilane compound by using at least one processing apparatus having an internal metal surface, said method comprising the following steps:

(a) pretreating at least one portion of the internal metal surface of said at least one processing apparatus with at least one sulfur-free organosilane compound having at least one hydrolizable group;

(b) feeding said crosslinkable elastomeric composition comprising silica to said at least one processing apparatus;

(c) processing said crosslinkable elastomeric composition.

According to a further aspect, the present invention also relates to a method for treating a metal surface with at least one sulfur-free organosilane compound having at least one hydrolizable group.

DETAILED DESCRIPTION OF THE INVENTION

According to a still further aspect, the present invention also relates to a metal article having at least one surface which is at least partially coated, preferably entirely coated, with at least one coating layer comprising at least one sulfur-free organosilane compound having at least one hydrolizable group.

According to one preferred embodiment, said at least one processing apparatus may be selected, for example, from: mixing devices, such as, for example: open mixers of open-mill type; roll mill mixers; internal mixers of the type with tangential rotors (Banbury) or with interlocking rotors (Intermix); continuous mixers (i.e. extruders) of Ko-Kneader type (Buss—single screw type), or of co-rotating or counter-rotating twin-screw type. Alternatively, said processing apparatus may be selected, for example, from: calendering devices; moulding devices.

According to one preferred embodiment, the internal metal surface of said at least one processing apparatus may be entirely pretreated with at least one sulfur-free organosilane compound having at least one hydrolizable group.

According to one preferred embodiment, the internal metal surface of said processing apparatus may be made of a metal selected, for example, from: steel, in particular, ferrochrome steel, cast steel, galvanized steel, cold rolled steel, carbon steel; aluminum or aluminum alloys; chrome or chrome alloys; copper or copper alloys; tin or tin alloys; zinc or zinc alloys. Ferrochrome steel, or cast steel are particularly preferred.

According to one preferred embodiment, said at least one silica reinforcing filler may be a pyrogenic silica or, preferably, a precipitated silica, with a BET surface area (measured according to ISO standard 5794/1) of from 50 m$^2$/g to 500 m$^2$/g, preferably of from 70 m$^2$/g to 200 m$^2$/g.

According to one preferred embodiment, said at least one silica reinforcing filler is present in the crosslinkable elastomeric composition in an amount of from 0.1 phr to 120 phr, more preferably from 20 phr to 90 phr.

For the purposes of the present description and of the claims which follow, the term "phr" means the parts by weight of a given component of the crosslinkable elastomeric composition per 100 parts by weight of elastomeric polymer(s).

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to one preferred embodiment, said at least one sulfur-containing organosilane compound may be selected, for example, from compounds having general formula (I):

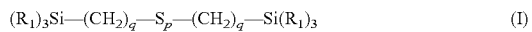   (I)

wherein:
the groups $R_1$, which may be equal or different from each other, are selected from: linear or branched $C_1$-$C_{30}$ alkyl groups; linear or branched $C_1$-$C_{30}$ alkoxy groups; $C_6$-$C_{18}$ aryloxy groups; halogen atoms such as, for example, fluorine, bromine; on condition that at least one of the groups $R_1$ is an alkoxy or aryloxy group;
p is an integer of from 1 to 10, extremes included;
q is 0 or an integer of from 1 to 10, extremes included.

According to one preferred embodiment, said at least one sulfur-containing organosilane compound having general formula (I) may be selected, for example, from: bis(3-triethoxysilylpropyl)tetrasulfide, bis(3-tri-ethoxysilylpropyl) disulfide, or mixtures thereof. Said sulfur-containing organosilane compound may be used as such or as a suitable mixture with an inert filler (for example, carbon black) so as to facilitate its incorporation into the elastomeric polymer(s).

According to one preferred embodiment, said sulfur-containing organosilane compound is present in the crosslinkable elastomeric composition in an amount of from 0.1 phr to 10 phr, preferably of from 0.5 phr to 5 phr.

Sulfur-containing organosilane compounds which may be used in the present invention and which are currently commercially available are the products Si 69®, or Si 75®, from Degussa-Hüls.

According to one preferred embodiment, said at least one sulfur-free organosilane compound having at least one hydrolizable group may be selected, for example, from compounds having general formula (II):

   (II)

wherein:
the groups R, which may be equal or different from each other, are selected from: linear or branched $C_1$-$C_{30}$ alkyl groups; linear or branched $C_1$-$C_{30}$ alkoxy groups; $C_6$-$C_{18}$ aryloxy groups; halogen atoms such as, for example, fluorine, bromine, on condition that at least one of the groups R is an alkoxy or aryloxy group; preferably, all the groups R are alkoxy or aryloxy group;
Z is a group selected from: —$C_nH_{2n+1}$ groups wherein n is an integer of from 1 to 30 extremes included; —$(CF_2)_m$ $CF_3$ groups wherein m is an integer of from 1 to 30 extremes included; —$C_nH_{2n}$—Si(R)$_3$, or —S—COR groups, wherein n and R groups are defined as above; —$C_nH_{2n}$—Y groups wherein n is defined as above and Y is a group selected from: nitroso, mercapto, amino, epoxide, vinyl, imide, chloro.

According to a further preferred embodiment, said sulfur-free organosilane compound having at least one hydrolizable group may be selected, for example, from: octyltrimethoxysilane, octyltriethoxysilane, octadecyl-triethoysilane, 1H,1H,2H,2H-perfluorooctyltrimethoxy-silane, 1H,1H,2H, 2H-perfluorooctyltriethoxysilane, 1H,1H-perfluoroheptylt-rimethoxysilane, 1H,1H-perfluoroheptyl-triethoxysilane, perfluorohexyltrimethoxysilane, perfluorohexyltriethoxy-silane, perfluoropentyltrimethoxysilane, perfluoropentyltri-ethoxysilane, perfluorobutyltrimethoxysilane, perfluorobutyltriethoxysilane, or mixtures thereof. Octyltriethoxysilane, 1H,1H,2H,2H-perfluorooctyltriethoxysilane, or mixtures thereof, are particularly preferred. 1H,1H,2H,2H-perfluorooctyltriethoxysilane is still particularly preferred.

Sulfur-free organosilane compounds which may be used in the present invention and which are currently commercially available are the products VP Si 208® from Degussa-Hüls, or perfluorosilane compounds from Chemos GmbH.

According to one preferred embodiment, said crosslinkable elastomeric composition further comprises at least one diene elastomeric polymer which may be selected from those commonly used in sulfur-crosslinkable elastomeric compositions, that are particularly suitable for producing tires, that is to say from elastomeric polymers or copolymers with an unsaturated chain having a glass transition temperature ($T_g$) generally below 20° C., preferably in the range of from 0° C. to −110° C. These polymers or copolymers may be of natural origin or may be obtained by solution polymerization, emulsion polymerization or gas-phase polymerization of one or more conjugated diolefins, optionally blended with at least one comonomer selected from monovinylarenes and/or polar comonomers.

Preferably, said diene elastomeric polymer may be selected, for example, from: cis-1,4-polyisoprene (natural or synthetic, preferably natural rubber), 3,4-polyisoprene, polybutadiene, optionally halogenated isoprene/isobutene copolymers, 1,3-butadiene/acrylo-nitrile copolymers, styrene/1,3-butadiene copolymers, styrene/isoprene/1,3-butadiene copolymers, styrene/1,3-butadiene/acrylonitrile copolymers, or mixtures thereof.

The above reported crosslinkable elastomeric composition may optionally comprise at least one elastomeric polymer of one or more monoolefins with an olefinic comonomer or derivatives thereof. Preferably, said elastomeric polymer may be selected, for example, from: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

Additional reinforcing fillers may be added to the abovementioned crosslinkable elastomeric composition, such as, for example, carbon black, alumina, aluminum silicates, calcium carbonate, kaolin, or mixtures thereof. Carbon black is particularly preferred. The carbon black grades usable according to the present invention may be selected from those conventionally used in tyre manufacturing, generally having a surface area not smaller than 20 $m^2/g$ (determined by CTAB absorption as described in ISO standard 6810).

The abovementioned crosslinkable elastomeric compositions may be vulcanized according to known techniques, and in particular with sulfur-based vulcanizing systems commonly employed for diene elastomers. To this purpose, after a first thermal-mechanical working steps, sulfur or a sulfur-containing vulcanizing agent is incorporated in the composition together with vulcanization activators and accelerators. In this second working step, the temperature is generally kept below 120° C., preferably below 100° C., to prevent undesired pre-cross-linking phenomena.

The vulcanizing agent of most advantageous use is sulfur or sulfur-containing molecules (sulfur donors) with accelerators and activators known to anyone skilled in the art.

Particularly effective activating agents are zinc compounds and in particular ZnO, $ZnCO_3$, zinc salts of fatty acids, saturated or unsaturated; having from 8 to 18 carbon atoms, such as for instance zinc stearate, preferably formed in situ in the rubber composition starting from ZnO and fatty acid, as well as BiO, PbO, $Pb_3O_4$, $PbO_2$, and mixtures thereof.

Accelerators of common use may be selected, for example, from: dithiocarbamates, guanidines, thioureas, thiazoles, sulphenamides, tiourams, amines, xanthates, and the like, or mixtures thereof.

The abovementioned crosslinkable elastomeric composition may comprise other commonly used additives selected on the basis of the specific application for which the composition is intended. For example, the following may be added to said composition: antioxidants, anti-ageing agents, plasticizers (such as, for example, mineral oils, vegetable oils, synthetic oils, or mixtures thereof, such as, for example, aromatic oil, naphthenic oil, phthalates, soybean oil, or mixtures thereof), adhesives, anti-ozone agents, modifying resins, fibres (for example Kevlar® pulp), or mixtures thereof.

In order to remove all the residues optionally present onto the internal metal surface of said at least one processing apparatus, before said pretreating step (a), at least one cleaning step ($a_1$) may be carried out.

Preferably, said cleaning step ($a_1$) may be carried out by using at least one solvent which may be selected, for example, from: aromatic hydrocarbons (for example, benzene, toluene, ethylbenzene, xylene); alicyclic hydrocarbon (for example, cyclohexane); aliphatic hydrocarbons (for example, hexane, heptane, octane); alcohols (for example, methanol, ethanol, isopropyl alcohol); ketones (for example, methyl ethyl ketone); esters (for example, ethyl acetate); ethers (for example, 1,4-dioxane); or mixtures thereof. Aliphatic hydrocarbons are particularly preferred, heptane is still particularly preferred.

Said cleaning step ($a_1$) may be carried out by techniques known in the art such as, for example, by wiping the internal metal surface with a tissue or cloth soaked in at least one of the solvents above disclosed Alternatively, said cleaning step ($a_1$) may be carried out mechanically by means of abrasive devices such as, for example, by means of grit silicon carbide (SiC) papers, preferably, in the presence of at least one of the solvents above disclosed as a lubricant. Preferably, after said mechanical cleaning, the internal metal surface may be subjected to an ultrasound treatment, more preferably in the presence of at least one of the solvents above disclosed.

In order to improve the reaction of said at least one sulfur-free organosilane compound onto the internal metal surface, before said pretreating step (a), at least one additional pretreating step ($a_2$) may be carried out.

Preferably said additional pretreating step ($a_2$) may be carried out by using an aqueous sodium hydroxide solution (10% in volume), or an aqueous acid solution such as, for example, an aqueous chloridric acid solution (10% in volume). Said additional pretreating step ($a_2$) may be carried out by techniques known in the art such as, for example, by wiping, or by spraying.

Preferably, after said cleaning step ($a_1$) and/or said additional pretreating step ($a_2$) have been carried out, the internal metal surface may be allowed to dry, at room temperature (23° C.), for a time of from 5 min to 30 min, preferably of from 8 min to 20 min, and subsequently wiped with a dampened tissue or cloth.

According to one preferred embodiment, said pretreating step (a) is carried out by applying a solvent solution of at least one sulfur-free organosilane compound having at least one hydrolizable group onto the internal metal surface. Preferably, said at least one sulfur-free organosilane compound having at least one hydrolizable group may be used in solution with a solvent which may be selected, for example, from: aromatic hydrocarbons (for example, benzene, toluene, ethylbenzene, xylene); alicyclic hydrocarbon (for example, cyclohexane); aliphatic hydrocarbons (for example, hexane, heptane, octane); alcohols (for example, methanol, ethanol, isopropyl alcohol); ketones (for example, methyl ethyl ketone); esters (for example, ethyl acetate); ethers (for example, 1,4-dioxane); or mixtures thereof. Aliphatic hydrocarbons are particularly preferred, heptane is still particularly preferred. Preferably, said at least one sulfur-free organosilane compound having at least one hydrolizable group may be used in solution with the same solvent used in the cleaning step ($a_1$) above disclosed.

According to one preferred embodiment, the concentration of said at least one sulfur-free organosilane compound having at least one hydrolizable group in the solvent solution is of from 5% by volume to 20% by volume, preferably of from 8% by volume to 15% by volume.

Optionally, a second application of said solvent solution onto the internal metal surface may be carried out. To this aim, preferably, after the first application of said solvent solution, the internal metal surface is allowed to dry for a time of from 5 min to 20 min, preferably of from 10 min to 15 min, at a temperature of from room temperature (23° C.) to 70° C., preferably of from 40° C. to 60° C., before carrying out said second application.

Said solvent solution may be applied by techniques known in the art such as, for example, spraying the solvent solution onto the metal surface, or brushing or wiping the solvent solution onto the metal surface. Whatever application method is used, the contact time should be sufficient to ensure at least a partial coating, preferably a complete coating, of the internal metal surface. For example, a contact time of from 30 min to 6 hours, preferably of from 1 hour to 2 hours, may be sufficient.

According to one preferred embodiment, after the application of said solvent solution, a crosslinking of the sulfur-free silane coating layer formed onto the internal metal surface, may be carried out. Preferably, said crosslinking may be carried out by allowing the coated internal metal surface to dry at a temperature of from room temperature (23° C.) to 80° C., preferably of from 40° C. to 70° C., for a time of from 5 min to 30 hours, preferably of from 40 min to 26 hours.

According to a further preferred embodiment, said crosslinking may be carried out in the presence of moist air (for example, about 70% humidity), or of steam.

Preferably, after the crosslinking has been carried out, the internal metal surface may be washed with at least one solvent and subsequently dry with a tissue or a cloth. Preferably, said solvent may be selected from those above disclosed, more preferably it may be the same solvent used for the solvent solution of at least one sulfur-free organosilane compound having at least one hydrolizable group.

According to one preferred embodiment, the internal metal surface of said processing apparatus is at least partially coated, more preferably entirely coated, with at least one coating layer comprising at least one crosslinked sulfur-free organosilane compound having at least one hydrolizable group, said at least one coating layer having a thickness of from 2 μm to 20 μm, preferably of from 4 μm to 10 μm.

According to one preferred embodiment, the processing step (c) of the crosslinkable elastomeric composition may be carried out by means of a mixing device. To this aim, the elastomeric polymer(s), the silica reinforcing filler, the sulfur-containing organosilane compound having general formula (I), and the other additives optionally present, are fed to said mixing device. The mixing device may be selected from those above disclosed.

According to a further preferred embodiment, the processing step (c) of said crosslinkable elastomeric composition, may be carried out by means of a calendering device. To this aim, the crosslinkable elastomeric composition which may be obtained by means of a mixing device as above disclosed, is fed to a calendering device.

According to a further preferred embodiment, the processing step (c) of said crosslinkable elastomeric composition, may be carried out by means of a moulding device. To this aim, the crosslinkable elastomeric composition which may be obtained by means of a mixing device as above disclosed, is fed to a moulding device.

The present invention will be further illustrated below by means of a number of preparation examples, which are given for purely indicative purposes and without any limitation of this invention.

EXAMPLE 1

Three ferrochrome steel samples having the following dimensions: diameter=25 mm and thickness=10 mm, were treated as follows.

SAMPLE A (COMPARATIVE)

Sample A was cleaned with a tissue soaked in heptane, was dried, at room temperature (23° C.), for 10 min, and subsequently wiped with a dampened tissue.

The sample was then placed in a heptane/bis(3-triethoxysilylpropyl)tetrasulfide solution (10% by volume) (silane used: Si 69® from Degussa-Hüls), for 24 hours, at room temperature (23° C.), and was subsequently washed with heptane and tissue dried.

SAMPLE B

Sample B was cleaned with a tissue soaked in a heptane, was dried, at room temperature (23° C.), for 10 min, and subsequently wiped with a dampened tissue.

The sample was then placed in a heptane/octyltriethoxysilane solution (10% by volume) (silane used: VP Si 208® from Degussa-Hüls), for 16 hours, at room temperature (23° C.), and was subsequently washed with heptane and tissue dried.

The sample was then placed in a heptane/bis(3-triethoxysilylpropyl)tetrasulfide solution (10% by volume) (silane used: Si 69® from Degussa-Hüls), for 24 hours, at room temperature (23° C.), and was subsequently washed with heptane and tissue dried.

SAMPLE C

Sample C was cleaned with a tissue soaked in a heptane, was dried, at room temperature (23° C.), for 10 min, and subsequently wiped with a dampened tissue.

The sample was then placed in a heptane/1H,1H,2H,2H-perfluorooctyltriethoxysilane solution (10% by volume) (silane used: product from Chemos GmbH), for 16 hours, at room temperature (23° C.), and was subsequently washed with heptane and tissue dried.

The sample was then placed in a heptane/bis(3-triethoxysilylpropyl)tetrasulfide solution (10% by volume) (silane used: Si 69® from Degussa-Hüls), for 24 hours, at room temperature (23° C.), and was subsequently washed with heptane and tissue dried.

To show the decrease of the absorption of bis(3-triethoxysilylpropyl)tetrasulfide onto the metal surface, the three samples obtained as above disclosed, were subjected to a X-ray photoelectron spectroscopy (XPS) by means of a Surface Science Instrument (SSI) M-Probe Spectrometer operating at a basic pressure of $3 \times 10^{-9}$ torr.

Each sample was irradiated with monochromatic Al Kα X-rays (1486.6 eV) using an X-ray spot size of 800 μm and 180 W power. Survey spectra were recorded with a pass energy of 150 eV, from which the surface chemical composition of the samples was determined.

Charge compensation for electrically insulating samples was achieved using a beam in a range of from 4 eV to 9 eV electrons, at a flood gun current of 16 mA, with an electrically grounded 90% transmission nickel mesh screen positioned at 1 mm above the sample surface.

The standard electron take off angle used for the analysis was 35° giving a maximum analysis depth lying in the range of from 3 nm to 5 nm.

The obtained XPS data are the following (the atomic % (At %) was given):

SAMPLE A (COMPARATIVE)

Sulfur: 11.8 At %;

SAMPLE B

Sulfur: 3.8 At %;

SAMPLE C

Sulfur: 0.4 At %.

The above reported XPS data show that the treatment of the metal surface with a sulfur-free organosilane compound having at least one hydrolizable group according to the present invention, reduce the level of the absorption of the sulfur-containing silane compound onto the metal surface and, consequently, the further adhesion of the elastomeric composition to the same.

In particular, Sample B shows a 67.8% reduction in the amount of the absorbed sulfur-containing organosilane compound, while Sample C shows a 96.6% reduction in the amount of the absorbed sulfur-containing organosilane compound, with respect to the amount of the absorbed sulfur-containing organosilane compound on Sample A (comparative—not treated with a sulfur-free organosilane compound).

The invention claimed is:

1. A method for processing a crosslinkable elastomeric composition comprising at least one silica reinforcing filler and at least one sulfur-containing organosilane compound by using at least one processing apparatus having an internal metal surface, comprising the following steps:
   (a) pretreating at least one portion of the internal metal surface of said at least one processing apparatus with at least one sulfur-free organosilane compound having at least one hydrolizable group;
   (b) feeding said crosslinkable elastomeric composition comprising silica to said at least one processing apparatus; and
   (c) processing said crosslinkable elastomeric composition, wherein said at least one sulfur-free organosilane compound having at least one hydrolizable group is chosen from
   1H,1H,2H,2H-perfluorooctyltrimethoxysilane,
   1 H,1H,2H,2H-perfluorooctyltriethoxysilane,
   1 H,1 H-perfluorcheptyltrimethoxysilane,
   1 H,1 H-perfluoroheptyltriethoxysilane,
   perfluorohexyltrimethoxysilane,
   perfluorohexyltriethoxysilane,
   perfluoropentyltrimethoxysilane,
   perfluoropentyltriethoxysilane,
   perfluorobutyltrimethoxysilane,
   perfluorobutyltriethoxysilane,
   or mixtures thereof.

2. The method for processing a crosslinkable elastomeric composition according to claim 1, wherein said at least one processing apparatus is selected from: mixing devices, open mixers of open-mill type; roll mill mixers; Banbury mixers, internal mixers of the type with tangential rotors or with interlocking rotors, Intermix; and continuous mixers or extruders of Ko-Kneader type, Buss - single screw type, or of co-rotating or counter-rotating twin-screw type.

3. The method for processing a crosslinkable elastomeric composition according to claim 1, wherein said processing apparatus is selected from: calendering devices and moulding devices.

4. The method for processing a crosslinkable elastomeric composition according to claim 1, wherein the internal metal surface of said at least one processing apparatus is entirely pretreated with at least one sulfur-free organosilane compound having at least one hydrolizable group.

5. The method for processing a crosslinkable elastomeric composition according to claim 1, wherein the internal metal surface of said processing apparatus is made of a metal selected from: steel, ferrochrome steel, cast steel, galvanized steel, cold rolled steel, carbon steel; aluminum or aluminum alloys; chrome or chrome alloys; copper or copper alloys; tin or tin alloys; and zinc or zinc alloys.

6. The method for processing a crosslinkable elastomeric composition according to claim 5, wherein the internal metal surface of said processing apparatus is made of a metal selected from ferrochrome steel or cast steel.

7. The method for processing a crosslinkable elastomeric composition according to claim 1, wherein said at least one silica reinforcing filler comprises 50 $m^2/g$ to 500 $m^2/g$ of a pyrogenic silica with a BET surface area (measured according to ISO standard 5794/1).

8. The method for processing a crosslinkable elastomeric composition according to claim 1, wherein said at least one silica reinforcing filler is present in the crosslinkable elastomeric composition in an amount of 0.1 phr to 120 phr.

9. The method for processing a crosslinkable elastomeric composition according to claim 8, wherein said at least one silica reinforcing filler is present in the crosslinkable elastomeric composition in an amount of 20 phr to 90 phr.

10. The method for processing a crosslinkable elastomeric composition according to claim 1, wherein said at least one sulfur-containing organosilane compound is selected from compounds having general formula (I):

$$(R_1)_3Si-(CH_2)_q-S_p-(CH_2)_q-Si(R_1)_3 \qquad (I)$$

wherein:
the $R_1$ groups, which may be the same or different from each other, are selected from: linear or branched $C_1$-$C_{30}$ alkyl groups; linear or branched $C_1$-$C_{30}$ alkoxy groups; $C_6$-$C_{18}$ aryloxy groups; halogen atoms, fluorine atoms, or bromine atoms; on condition that at least one of the $R_1$ groups is an alkoxy or aryloxy group;
p is an integer of from 1 to 10, extremes included; and
q is 0 or an integer of from 1 to 10, extremes included.

11. The method for processing a crosslinkable elastomeric composition according to claim 10, wherein said at least one sulfur-containing organosilane compound, having general formula (I) is selected from: bis(3-triethoxysilylpropyl)- tetrasulfide, bis(3-triethoxysilylpropyl)disulfide, or mixtures thereof.

12. The method for processing a crosslinkable elastomeric composition according to claim 1, wherein said sulfur-containing organosilane compound is present in the crosslinkable elastomeric composition in an amount of 0.1 phr to 10 phr.

13. The method for processing a crosslinkable elastomeric composition according to claim 12, wherein said sulfur-containing organosilane compound is present in the crosslinkable elastomeric composition in an amount of 0.5 phr to 5 phr.

14. The method for processing a crosslinkable elastomeric composition according to claim 1, wherein said sulfur-free organosilane compound having at least one hydrolizable group is 1H,1H,2H,2H-perfluorooctyltriethoxysilane.

15. The method for processing a crosslinkable elastomeric composition according to claim 1, wherein said crosslinkable elastomeric composition further comprises at least one diene elastomeric polymer having a glass transition temperature (Tg) below 20° C.

16. The method for processing a crosslinkable elastomeric composition according to claim 15, wherein said diene elastomeric polymer is selected from: natural or synthetic cis-1,4-polyisoprene, 3,4-polyisoprene, polybutadiene, halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, or mixtures thereof.

17. The method for processing a crosslinkable elastomeric composition according to claim 1, wherein said crosslinkable elastomeric composition further comprises at least one elastomeric polymer of one or more monoolefins with an olefinic comonomer or derivatives thereof.

18. The method for processing a crosslinkable elastomeric composition according to claim 1, wherein said crosslinkable elastomeric composition further comprises additional reinforcing fillers, carbon black, alumina, aluminum silicates, calcium carbonate, kaolin, or mixtures thereof.

19. The method for processing a crosslinkable elastomeric composition according to claim 1, comprising carrying out at least one cleaning step before pretreating step (a).

20. The method for processing a crosslinkable elastomeric composition according to claim 19, wherein said cleaning step is carried out by using at least one solvent which is selected from: aromatic hydrocarbons; alicyclic hydrocarbons; aliphatic hydrocarbons; alcohols, ketones, esters; ethers; or mixtures thereof.

21. The method for processing a crosslinkable elastomeric composition according to claim 19, wherein said cleaning step is carried out mechanically by means of abrasive devices.

22. The method for processing a crosslinkable elastomeric composition according to claim 1, comprising carrying out at least one additional pretreating step before pretreating step (a).

23. The method for processing a crosslinkable elastomeric composition according to claim 22, wherein said additional pretreating step is carried out by using a 10% by volume aqueous sodium hydroxide solution, a 10% by volume aqueous acid solution, or a 10% by volume aqueous chloridric acid solution.

24. The method for processing a crosslinkable elastomeric composition according to claim 1, comprising carrying out a cleaning step and/or carrying out an additional pretreating step, and after said cleaning step and/or said additional pretreating step have been carried out, allowing the internal metal surface to dry at room temperature for 5 min to 30 min, and subsequently wiping the internal metal surface with a dampened tissue or cloth.

25. The method for processing a crosslinkable elastomeric composition according to claim 1, wherein said pretreating step (a) is carried out by applying a solvent solution of at least one sulfur-free organosilane compound having at least one hydrolizable group on the internal metal surface.

26. The method for processing a crosslinkable elastomeric composition according to claim 25, wherein said at least one sulfur-free organosilane compound having at least one hydrolizable group is used in solution with a solvent selected from: aromatic hydrocarbons; alicyclic hydrocarbons; aliphatic hydrocarbons; alcohols; ketones; esters; ethers; or mixtures thereof.

27. The method for processing a crosslinkable elastomeric composition according to claim 25, wherein the concentration of said at least one sulfur-free organosilane compound having at least one hydrolizable group in the solvent solution is 5% by volume to 20% by volume.

28. The method for processing a crosslinkable elastomeric composition according to claim 27, wherein the concentration of said at least one sulfur-free organosilane compound having at least one hydrolizable group in the solvent solution is 8% by volume to 15% by volume.

29. The method for processing a crosslinkable elastomeric composition according to claim 25, comprising carrying out a second application of said solvent solution on the internal metal surface.

30. The method for processing a crosslinkable elastomeric composition according to claim 25, wherein, after the application of said solvent solution, carrying out a crosslinking of the sulfur-free silane coating layer formed on the internal metal surface.

31. The method for processing a crosslinkable elastomeric composition according to claim 30, wherein said crosslinking is carried out by allowing the coated internal metal surface to dry at room temperature to 80° C., for 5 min to 30 hours.

32. The method for processing a crosslinkable elastomeric composition according to claim 31, wherein said crosslinking is carried out by allowing the coated internal metal surface to dry at a temperature of 40° C. to 70° C.

33. The method for processing a crosslinkable elastomeric composition according to claim 31, wherein said crosslinking is carried out by allowing the coated internal metal surface to dry for 40 min to 26 hours.

34. The method for processing a crosslinkable elastomeric composition according to claim 30, wherein said crosslinking is carried out in the presence of moist air, or steam.

35. The method for processing a crosslinkable elastomeric composition according to claim 30, wherein said internal metal surface of said processing apparatus is at least partially coated with at least one coating layer comprising at least one crosslinked sulfur-free organosilane compound having at least one hydrolizable group, said at least one coating layer having a thickness of 2 μm to 20 μm.

36. The method for processing a crosslinkable elastomeric composition according to claim 35, wherein said at least one coating layer has a thickness of 4 μm to 10 μm.

37. The method for processing a crosslinkable elastomeric composition according to claim 1, wherein said processing step (c) is carried out by means of a mixing device.

38. The method for processing a crosslinkable elastomeric composition according to claim 1, wherein said processing step (c) is carried out by means of a calendering device.

39. The method for processing a crosslinkable elastomeric composition according to claim 1, wherein said processing step (c) is carried out by means of a moulding device.

* * * * *